May 18, 1937.            C. KIRACOFE              2,081,055
                         TANK CAP LOCK
                       Filed Feb. 20, 1936
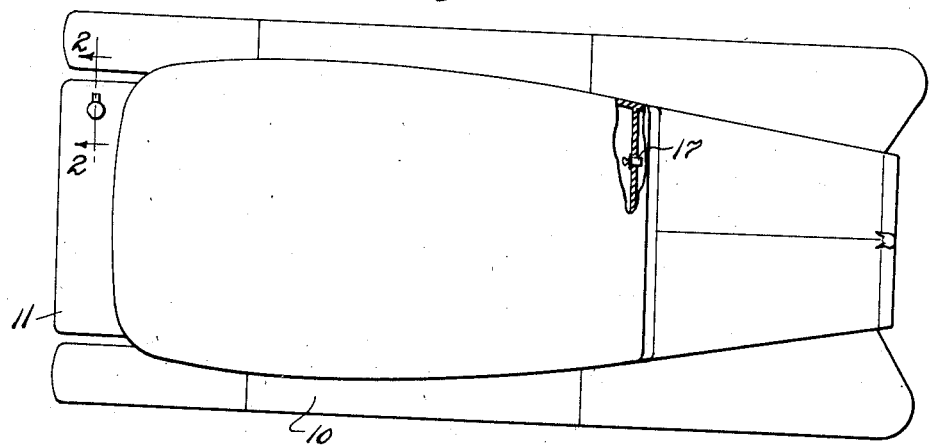
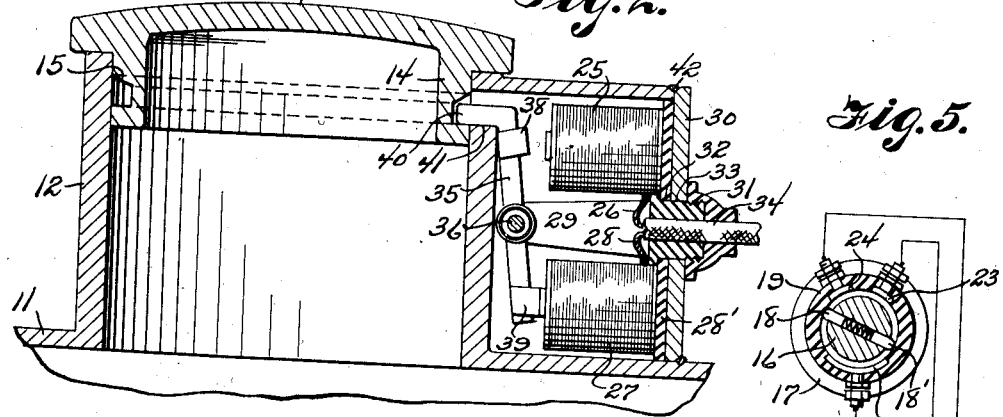
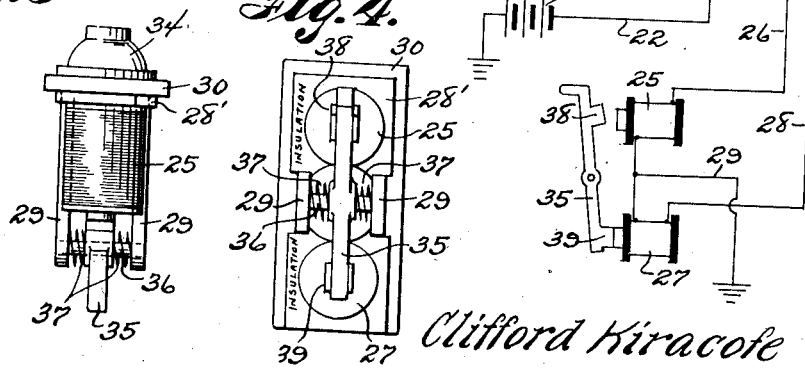
Clifford Kiracofe
INVENTOR
BY Victor J. Evans & Co.
ATTORNEY Patented May 18, 1937

2,081,055

UNITED STATES PATENT OFFICE 2,081,055

TANK CAP LOCK

Clifford Kiracofe, Lima, Ohio

Application February 20, 1936, Serial No. 64,993

2 Claims. (Cl. 70—166)

This invention relates to tank cap locks, more particularly to locks for the caps of gasoline tanks on motor vehicles, and has for an object to provide a lock which may be electrically controlled from the driver's seat to unlock the cap when the ignition switch is turned on, and to lock the cap when the ignition switch is turned off.

A further object of the invention is to provide a lock of this character in which the electric current will be used but momentarily to manipulate the lock, as the ignition switch is opened or closed, so that drain on the battery is reduced to a minimum.

A further object of the invention is to provide a device of this character which will be formed of a few strong, simple and durable parts, which will be easy to manufacture, and which will not easily get out of order.

With the above and other objects in view the invention consists in certain novel details of construction and combination of parts hereinafter fully described and claimed, it being understood that various modifications may be resorted to within the scope of the appended claims, without departing from the spirit or sacrificing any of the advantages of the invention.

In the accompanying drawing forming part of this specification,

Figure 1 is a plan view of an automobile with a tank cap lock constructed in accordance with the invention applied thereto.

Figure 2 is an enlarged cross sectional view taken on the line 2—2 of Figure 1 showing the cap lock in operative position.

Figure 3 is an end elevation of the electro-magnet and pivoted catch assembly.

Figure 4 is a bottom plan view of the parts shown in Figure 3.

Figure 5 is a diagrammatical view showing the circuit wiring for the parts and showing the ignition switch in cross section to expose the switch contacts for controlling the lock.

Referring now to the drawing in which like characters of reference designate similar parts in the various views, a conventional automobile 10 is shown having the usual gasoline tank 11 provided with a filling spout 12 which is closed by a flanged cap 13. In carrying out the invention, the flange 14 of the filling cap is provided with an annular peripheral groove 15 to receive an electrically controlled pivoted catch as will presently appear.

In further carrying out the invention, the stem 16 of the ignition switch 17 is provided with spring pressed pins 18 and 18' which project from the stem at diametrically opposite points thereof and ride upon the inner surface of the insulating casing 19 of the switch. A switch contact 20 is secured in the casing in position to be wiped over by the pin 18 and this contact is connected to the battery 21 by a conductor wire 22. A pair of switch contacts 23 and 24 are secured in the casing in position to be wiped across by the pin 18'. The contact 23 is connected to an electro-magnet 25 by a wire 26 while the contact 24 is connected to an electro-magnet 27 by means of a wire 28. Both electro-magnets are disposed close together and one side of each is grounded as shown at 29.

When the ignition switch is turned clockwise to "on" position the spring pressed pins will bridge first the contacts 20 and 24, and then the contacts 20 and 23 after which the pins pass beyond the contacts but insomuch as the contacts 23 and 20 were last bridged, the magnet 25 will have been energized to withdraw the hereinafter described catch and unlock the tank cap. When the ignition switch is turned counter-clockwise to "off" position, the reverse of the above described movements of the parts will take place and since the contacts 20 and 24 will have been last bridged, the electro-magnet 27 will be energized to move the catch to lock the cap to the filling spout. Thus drain on the battery is reduced to a minimum since current is used only momentarily as will be understood.

The electro-magnets 25 and 27 are mounted in juxtaposed position on a substantially oblong insulating plate 28 which is cut away intermediate the ends to receive parallel legs 29 of a back plate 30 to which the insulating plate is clamped by means of a flanged bushing 31 of insulating material which passes through registering openings 32 and 33 in the insulating plate and in the back plate. A nut 34 of insulating material is screwed onto the outer end of the flanged bushing and clamps the electro-magnets 25 and 27 and the insulating plate 28 to the plate 30.

An L shaped catch 35 is pivoted intermediate the ends of its long arm to the ends of the legs 29 by means of a pivot pin 36. Helical springs 37 surround the pivot pin outside of the catch and are confined under tension between the legs 29 and the opposite sides of the catch to restrain the catch against accidental movement by shocks and jars. The catch is provided on opposite sides of the pivot pin with armatures 38 and 39 which are adapted to be attracted respectively by the cores of the electro-magnets 25 and 27. The short leg 40 of the catch is adapted to pass through an opening 41 in the filling spout 12 of the tank and enter the groove 15 of the cap 13 to lock the cap against removal when the armature 39 is attracted by the core of the electromagnet 27 as previously described, that is when the ignition switch is turned to "off" position. When the ignition switch is turned to "on" position the armature 38 will be attracted by the core of the electro-magnet 25 and the short arm 40 of the catch will be withdrawn from the groove to unlock the cap 13.

The electro-magnet and catch assembly may be mounted on the gasoline tank 11 laterally of the filling spout 12 by means of an inverted U shaped plate which may be formed integral with the filling spout and to which the back plate 30 of the assembly may be spot welded as shown at 41 or otherwise secured.

From the above description it is thought that the construction and operation of the invention will be fully understood without further explanation.

What is claimed is:

1. A tank cap lock comprising a filling spout, a flanged filling cap having a circumferential groove in the flange, an L-shaped catch having the short arm adapted to project through an opening in the spout and enter the groove of the cap, a base plate, parallel legs projecting from the base plate, a pivot pin carried by the legs and extending through the long arm of the catch intermediate the ends thereof, armatures on said long arm on opposite sides of the pivot pin, springs on the pivot pin confined under tension between the legs and said long arm to prevent movement of the catch due to shock and jar, electro-magnets on the base plate and insulated therefrom, the cores of said magnets confronting associated ones of the armatures, and a plate mounting the base plate upon the filling spout and housing the electromagnets and the catch.

2. An electrically controlled tank cap lock comprising a filling spout, a flanged filling cap closing the spout, there being a circumferential groove in the flange of the cap, an L-shaped catch having the short arm adapted to project through an opening in the spout and enter the groove of the cap, a base plate, parallel legs projecting from the base plate, a pivot pin carried by the legs and extending through the long arm of the catch intermediate the ends thereof, armatures on said long arm on opposite sides of the pivot pin, springs on the pivot pin confined under tension between the legs and long arm to prevent movement of the catch due to shock and jar, and electro-magnets on the base plate insulated therefrom and having their cores confronting associated ones of the armatures for rocking the catch on the pivot pin to engage or disengage the catch from the groove in the filling cap flange.

CLIFFORD KIRACOFE.